United States Patent [19]

Aoki et al.

[11] 4,283,937
[45] Aug. 18, 1981

[54] METHOD OF DETECTING BROKEN WINDOW FOIL OF APPARATUS FOR TREATING WASTE GAS WITH IRRADIATION

[75] Inventors: Shinji Aoki, Tokyo; Keita Kawamura, Fujisawa; Tsutomu Higo, Chigasaki; Hitoshi Kimura, Fujisawa; Yasuhiro Sawada, Fuchu; Tsutomu Katayama; Katsumi Kengaku, both of Kitakyushu, all of Japan

[73] Assignees: Ebara Corp.; Shin Nippon Seitetsu Kabushiki Kaisha, both of Tokyo, Japan

[21] Appl. No.: 107,419

[22] Filed: Dec. 26, 1979

[30] Foreign Application Priority Data

Dec. 29, 1978 [JP] Japan ................................ 53-162154

[51] Int. Cl.³ ............................................. G01M 3/32
[52] U.S. Cl. ......................................... 73/49.3; 73/40; 73/40.7

[58] Field of Search ................ 73/49.3, 40.7, 46, 49.8, 73/40

[56] References Cited

U.S. PATENT DOCUMENTS

| 3,444,725 | 5/1969 | Chave ..................................... 73/40.7 |
| 3,489,311 | 1/1970 | Folkerts et al. ................... 73/40.7 X |
| 3,913,341 | 10/1975 | Katsuta ............................. 73/40.7 X |
| 3,942,331 | 3/1976 | Newman, Jr. et al. ............ 73/40.7 X |

FOREIGN PATENT DOCUMENTS 53-67673 6/1978 Japan .
53-75163 7/1978 Japan .

Primary Examiner—Gerald Goldberg
Assistant Examiner—Joseph W. Roskos
Attorney, Agent, or Firm—Howard L. Rose

[57] ABSTRACT

A method of detecting a broken foil that closes the opening of the window of the reaction vessel of an apparatus for treating waste gas with irradiation is disclosed. The detection is accomplished by monitoring a change in the window cooling gas.

11 Claims, 4 Drawing Figures

METHOD OF DETECTING BROKEN WINDOW FOIL OF APPARATUS FOR TREATING WASTE GAS WITH IRRADIATION

This invention relates to a method of detecting promptly a broken foil that closes the opening of a window to isolate the external atmosphere from the reaction vessel of an apparatus for treating industrial waste gas with irradiation.

One commercial method of treating industrial waste gas comprises introducing the gas into a vessel where it is irradiated through a window with the radiation from an external source (the vessel to be hereunder referred to as a reaction vessel), to thereby convert $SO_x$ and $NO_x$ in the gas into an aerosol such as a solid or mist, which is then passed through a dust collector for removal. The foil used to close the opening of the window is so thin that is frequently breaks during use.

If the foil breaks, gas cooling the outside surface of the window enters the waste gas, or instead, the waste gas leaks, thus preventing the proper treatment of the waste gas. In addition, scattered pieces of the foil may attack the slider mechanism of the window and prevent smooth sliding of the window. The scattered pieces may even damage the foil attached to the mouth of a radiation generator. Therefore, a broken foil must be promptly detected for replacement.

Heretofore, a break in the foil used to close the opening of the window of the reaction vessel has been detected by monitoring various changes occurring in the gas due to the entrance of the cooling gas, for example, the drop in the temperature of the gas being treated, or changes in the concentrations of $NO_x$ and $SO_x$ in the treated gas. However, as the waste gas to be treated increases, less cooling gas enters the waste gas, making it difficult to detect very slight damage to the foil.

Therefore, this invention provides means for prompt detection of a break in the foil that closes the opening of the window of the reaction vessel. The invention achieves this purpose by monitoring a physical or chemical change in the cooling air, rather than in the waste gas being treated.

The objects and advantages of this invention will be apparent by reading the following detailed description in conjunction with the accompanying drawings, in which.

Figure 1:
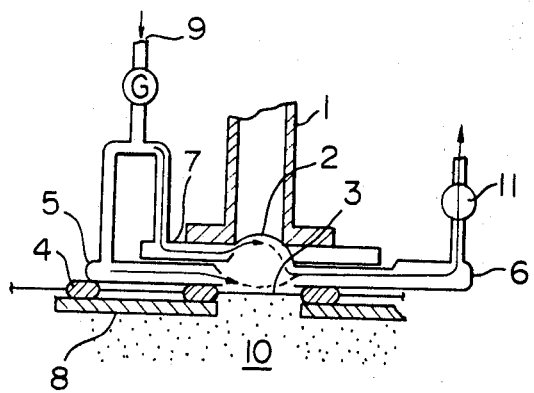
FIG. 1 is a side view of a detection apparatus incorporating one embodiment of this invention.

Referring to FIG. 1, a head 5 introduces gas which cools the foil 3 that closes the opening of the window of the reaction vessel, whereas a cooling nozzle attached to the flange 7 of the radiation generator introduced gas which cools the foil 2 that is attached to the mouth of the generator, and each gas is thereafter discharged through an outlet 6. The flow rate and/or pressure of the cooling gas discharged is detected at a sensor 11.

If a severe break occurs in the foil 3, part of the cooling gas flows into the industrial waste gas 10 in the reaction vessel which is usually placed under negative pressure, thus causing a change in the value read at the sensor 11. One unit of radiation generator uses only 1000 $Nm^3$ of cooling gas per hour, and this amount is so much smaller than the quantity of waste gas to be treated that, for a given degree of foil break, the cooling gas is by far more affected than the waste gas it has flown into. Accordingly, a slight damage to the foil can be detected far more simply by monitoring changes in the flow rate and pressure of the cooling gas discharged through the outlet 6 than by monitoring such changes occuring in the waste gas. The value read at the sensor 11 is converted to an electrical signal which is supplied to a control room for remote surveillance. In FIG. 1, the reference number 4 represents a slider for supporting the window foil 3, 8 is the outer walls of the reaction vessel, 9 is an inlet for cooling gas, and 10 is the waste gas.

Figure 2:
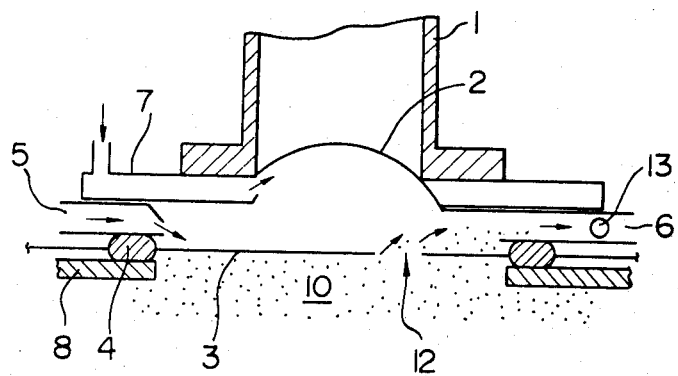
FIG. 2 is an enlarged view of FIG. 1.
Figure 3:
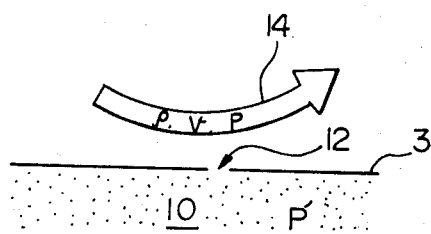
FIG. 3 illustrates how the flow of cooling gas is affected by a break in the foil that closes the opening of the window of the reaction vessel.

When the break in the foil is slight such as in the form of a crack or pinhole and causes no appreciable change in the flow of the cooling gas, Bernoulli's theorem governs and the waste gas 10 is sucked into the cooling gas, as shown in FIG. 2. The mechanism of this phenomenon is described by reference to FIG. 3 wherein $\rho$, v and p represent the density, velocity and pressure of the cooling gas. The symbol $P'$ represents the pressure of the waste gas 10, which is a negative pressure of only 1 mAq. Several tens to several hundreds of meters per second will be selected as the value of v. If gc is written for the gravitational conversion factor, Bernoulli's theorem gives the relationship $P-(\rho v^2)/2gc < P'$, which indicates that the waste gas 10 is sucked into the cooling gas. In the illustrated case, the cooling gas is sampled at the sensor 11, and the gas sampled is subjected to analysis for detection of very slight damage to the foil. It is to be understood that detection at the sensor 11 may be replaced by measuring of the total pressure of the cooling gas sampled at a site indicated by 13 in FIG. 2. In this alternative case, the cooling gas may be immediately discharged through the outlet 6.

Since a break in the foil causes a change in the flow characteristics of gas, the effect described above can also be achieved by measuring the primary pressure at the head 5 or the cooling nozzle attached to the flange 7, or alternatively by monitoring the difference between the pressure at the inlet for cooling gas 9 and that at the sensor 11 or measuring site 13.

Another effective method is to use a sensitive temperature probe that monitors a temperature increase or decrease at the sensor 11 or measuring site 13 caused by the entrance of cooling gas into the waste gas or leakage of the waste gas upon foil breaking.

As mentioned before, the cooling gas usually flows fast at a rate between several tens and several hundreds meters per second and the foil 3 is rendered very thin to increase the irradiation efficiency, and for this reason, a break in the foil causes an abnormal sound of vibration. A slight damage to the foil may be detected by sensing the sound with a probe microphone provided in a place close to the foil, followed by analysis of the sound pressure and frequency of the sound.

Figure 4:
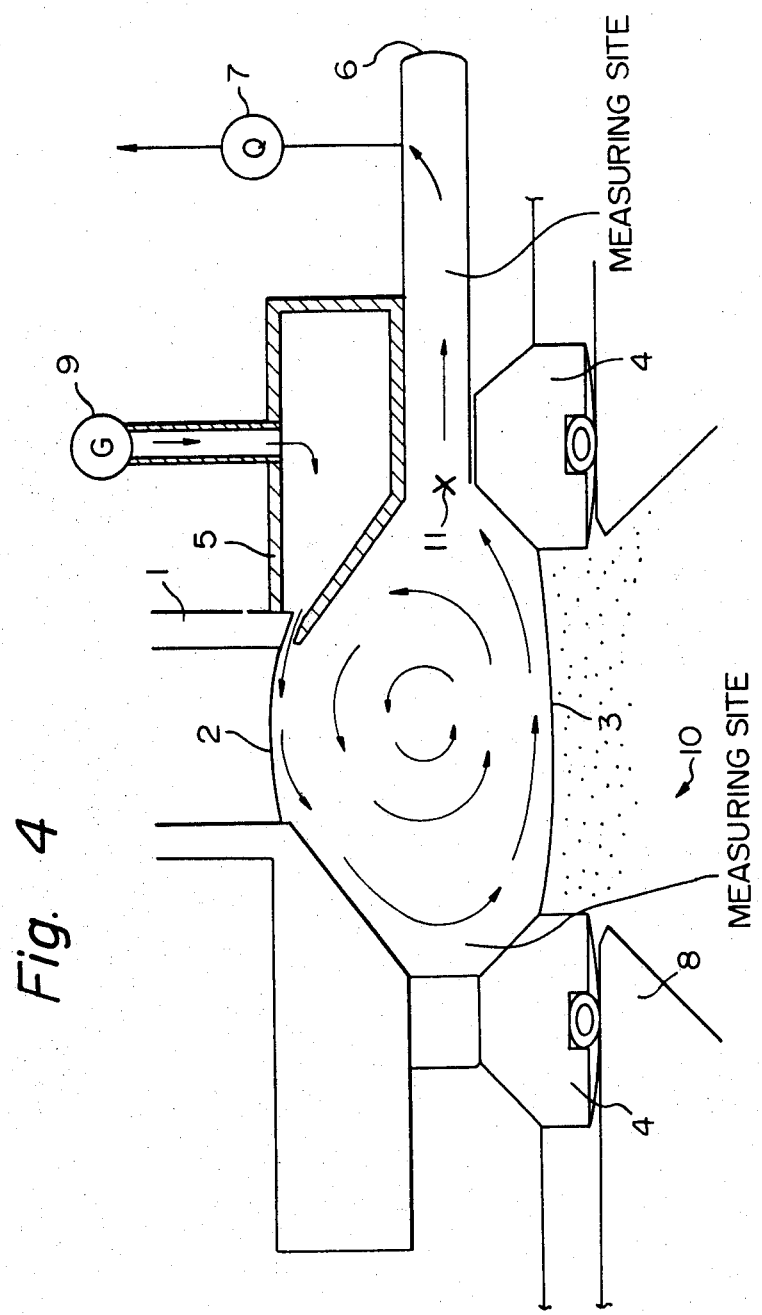
FIG. 4 illustrates another embodiment of this invention wherein cooling gas flowing close to the mouth of the radiation generator is caused to make a U-turn.

It is to be emphasized here that the embodiment illustrated in the foregoing can be applied, without any modification, to detection of a broken foil as shown in FIG. 4 wherein cooling gas flowing close to the mouth of the radiation generator is caused to make a U-turn.

As described hereinabove, the method of this invention monitors a change in the cooling gas to detect a break in the foil that closes the opening of the window of the reaction vessel, and such method is far more sensitive than the conventional method that monitors a change in the waste gas (being treated) to achieve the same purpose.

If a plurality of foils are to be used simultaneously, a sensor is disposed at each unit of the irradiator and reaction vessel assembly, and the values read by sensors are monitored by a smaller number of analyzers or recorders which switch from one sensor to another to achieve economical analysis and recording of the values.

What is claimed is:

1. A method of detecting the breakage of a window-foil that closes the radiation inlet opening of the reactor of an apparatus for treating waste gas by irradiation, said radiation being emitted from the radiation generator of said apparatus through another window-foil that closes the radiation outlet opening of the radiation generator to provide incident radiation into said reactor through which the waste gas to be irradiated flows, characterized in that said method comprises forming a closed fluid flow system including the space between the two window-foils, flowing a cooling fluid through the closed system such that cooling fluid is caused to flow over both of the window-foils whereby to cool the window-foils, monitoring at least one of the physical parameters of the cooling fluid, and producing a response to a change in such physical parameter that is indicative of a break in the window-foil that closes the radiation inlet opening of the reactor.

2. A method according to claim 1 wherein a change in the flow rate of the cooling gas is monitored.

3. A method according to claim 1 wherein a change in the temperature of the cooling gas is monitored.

4. A method according to claim 1 wherein a change in the chemical composition of the cooling gas is monitored.

5. A method according to claim 1 wherein a change in the vibratory sound of the cooling gas is monitored.

6. A method according to claim 2 or claim 1 wherein a change of pressure of the cooling gas is monitored.

7. A method according to claim 1 further including establishing a fixed value of the parameter of the cooling fluid introduced into the closed system which parameter is to be monitored to indicate a break of the window-foil.

8. A method according to claim 1 wherein the cooling fluid is exhausted to atmosphere after monitoring for a change in the selected parameter.

9. A system for detecting a break in a radiation penetrable window in a reaction chamber comprising a reaction chamber having walls, a foil window in a wall of said reaction chambers, a generator of radiation, a foil window in said generator of radiation aligned with and spaced from said first mentioned foil window whereby radiation from said radiation generator may pass from said radiation generator into said reaction chamber, means for defining a closed volume including the space between said foil windows, means for flowing cooling fluid for said foil windows into said space and over said foil windows, and means for monitoring changes in at least one physical parameter of the cooling fluid due to a break in said first mentioned foil window.

10. A method according to claim 9 wherein said means for flowing directs cooling flow against said foil windows.

11. A method according to claim 9 wherein said means for flowing produces swirling of the fluid in a plane perpendicular to the surface of said windows.

* * * * *